(12) United States Patent
Koike et al.

(10) Patent No.: US 7,090,886 B2
(45) Date of Patent: Aug. 15, 2006

(54) OIL/FAT COMPOSITION

(75) Inventors: Shin Koike, Tokyo (JP); Takeshi Yasumasu, Tokyo (JP); Tadashi Hase, Tochigi (JP); Takatoshi Murase, Tochigi (JP); Yoshihisa Katsuragi, Tokyo (JP); Akira Takei, Tokyo (JP)

(73) Assignee: Kao Corporation, Tokyo (JP)

( * ) Notice: Subject to any disclaimer, the term of this patent is extended or adjusted under 35 U.S.C. 154(b) by 680 days.

(21) Appl. No.: 10/343,748

(22) PCT Filed: Aug. 7, 2001

(86) PCT No.: PCT/JP01/06777

§ 371 (c)(1),
(2), (4) Date: Feb. 6, 2003

(87) PCT Pub. No.: WO02/11552

PCT Pub. Date: Feb. 14, 2002

(65) Prior Publication Data

US 2004/0052920 A1    Mar. 18, 2004

(30) Foreign Application Priority Data

Aug. 8, 2000 (JP) .............................. 2000-239573

(51) Int. Cl.
A23D 9/007 (2006.01)
(52) U.S. Cl. ...................... 426/601; 424/439
(58) Field of Classification Search ............ None
See application file for complete search history.

(56) References Cited

U.S. PATENT DOCUMENTS

| | | | |
|---|---|---|---|
| 6,036,992 A | 3/2000 | Dohnalek et al. | |
| 6,448,292 B1 * | 9/2002 | Koike et al. | 514/558 |
| 6,495,536 B1 * | 12/2002 | Masui et al. | 514/182 |
| 6,896,922 B1 * | 5/2005 | Kudo et al. | 426/541 |
| 2002/0142089 A1 * | 10/2002 | Koike et al. | 426/607 |
| 2003/0096867 A1 * | 5/2003 | Masui et al. | 514/547 |
| 2004/0062847 A1 * | 4/2004 | Koike et al. | 426/601 |
| 2004/0072858 A1 * | 4/2004 | Charles et al. | 514/292 |

FOREIGN PATENT DOCUMENTS

| | | |
|---|---|---|
| JP | 56 140859 | 11/1981 |
| JP | 63 104917 | 5/1988 |
| WO | 01 13733 | 3/2001 |

OTHER PUBLICATIONS

U.S. Appl. No. 10/101,606, filed Mar. 21, 2002, Kataoka et al.
U.S. Appl. No. 09/926,741, filed Dec. 11, 2001, Kawai et al.
U.S. Appl. No. 09/900,053, filed Jul. 9, 2001, Sugiura et al.
U.S. Appl. No. 09/907,811, filed Jul. 19, 2001, Nakajima et al.
U.S. Appl. No. 09/985,755, filed Nov. 6, 2001, Kudo et al.
U.S. Appl. No. 10/014,356, filed Dec. 14, 2001, Kawai et al.
U.S. Appl. No. 10/101,607, filed Mar. 21, 2002, Suzuki et al.
U.S. Appl. No. 10/120,514, filed Apr. 12, 2002, Sakai et al.
U.S. Appl. No. 10/166,687, filed Jun. 12, 2002, Komatsu et al.
U.S. Appl. No. 10/014,449, filed Dec. 14, 2001, Sakai et al.
U.S. Appl. No. 10/083,387, filed Feb. 27, 2002, Sakai et al.
U.S. Appl. No. 10/131,188, filed Apr. 25, 2002, Hase et al.
U.S. Appl. No. 10/259,615, filed Sep. 30, 2002, Sakai et al.
U.S. Appl. No. 10/244,736, filed Sep. 17, 2002, Masui et al.
U.S. Appl. No. 10/238,720, filed Sep. 11, 2002, Hase et al.
U.S. Appl. No. 10/032,493, filed Jan. 2, 2002, Koike et al.
U.S. Appl. No. 10/132,504, filed Apr. 26, 2002, Koike et al.
U.S. Appl. No. 10/061,286, filed Feb. 4, 2002, Koike et al.
U.S. Appl. No. 10/343,831, filed Feb. 10, 2003, Koike et al.
U.S. Appl. No. 10/343,742, filed Feb. 6, 2003, Koike et al.
U.S. Appl. No. 10/019,427, filed Dec. 31, 2001, Masui et al.
U.S. Appl. No. 10/009,494, filed Apr. 8, 2002, Masui et al.
U.S. Appl. No. 10/761,358, filed Jan. 22, 2004, Koike et al.
U.S. Appl. No. 10/857,020, filed Jun. 1, 2004, Moriwaki et al.

* cited by examiner

*Primary Examiner*—Carolyn Paden
(74) *Attorney, Agent, or Firm*—Oblon, Spivak, McClelland, Maier & Neustadt, P.C.

(57) ABSTRACT

Abstract Provided is an oil/fat composition comprising 60 to 100 wt. % of a diglyceride wherein the diglyceride has, as the fatty acid constituent thereof, 15 to 90 wt. % of an ω 3-unsaturated fatty acid having less than 20 carbon atoms and a cis ω 3-unsaturated fatty acid/(cis ω 6-unsaturated fatty acid+saturated fatty acid+trans unsaturated fatty acid) at a weight ratio of 1 to 6. The composition is excellent in visceral fat burning property, body fat burning property and stability against autoxidation.

15 Claims, No Drawings

OIL/FAT COMPOSITION

TECHNICAL FIELD

The present invention relates to an oil/fat composition having a specific glyceride composition and a specific fatty acid composition, having good stability against autoxidation, and being extremely useful for health with excellent visceral-fat burning and body-fat burning properties.

BACKGROUND ART

Lipids (oils or fats), important nutrients in addition to proteins and carbohydrates, are particularly useful as an energy source. It however has a high calorie content (9 kcal/g) and intake of it promotes obesity and can be causative of problems such as life-style related diseases. A meal rich in lipid is typically delicious and people of the present day are accustomed to such a meal. In advanced countries under satiation, an increase in lipidic intake has come to be a serious nation-wide problem together with a rise in medical expenses. In recent days, people are highly interested particularly in health promotion and maintenance and preventive treatment of diseases and a number of investigations have been made on the relationship between lipids and obesity or life-style related diseases.

Primary investigations to date have been related to fatty acids constituting a triglyceride, a principal component of a lipid. Nutritionally essential fatty acids are, for example, linoleic acid, arachidonic acid and linolenic acid. These fatty acids are known to be utilized in the body as a constituent of a biomembrane or a raw material of eicosanoids (prostaglandin, thromboxanes, leukotrienes, etc.). In addition, it is reported that there is a high possibility that saturated fatty acids in a diet have a blood-serum cholesterol heightening action, leading to atherosclerosis or heart diseases (Lancet, 2, 959(1950)); and a high linoleic acid oil contained much in a diet increases tumor incidence and size of experimental animals (J. National Cancer Institute, 66, 517(1971)). It is described that an oleic-acid-rich and saturated-fatty-acid-poor diet lowers LDL-cholesterol level, while maintaining an HDL-cholesterol level, thereby reducing the risk of heart diseases (J. Lipid Res., 26, 194(1985), New England J. Medicine, 314, 745(1988)). In addition, physiological activity of various ω 3-unsaturated fatty acids including anti-thrombus effects of eicosapentaenoic acid contained in a fish oil have drawn attention (Ann. Rev. Nutr., 8, 517(1988)). It is however pointed out that eicosapentaenoic acid or docosahexaenoic acid having high physiological activity has more double bonds than the other fatty acids so that it has a serious problem in not only heat stability but also stability against autoxidation. Under the present state, such fatty acids are practically used only for some products. Based on the study on intake balance of these fatty acids, a number of research reports have been presented, for example, on a recommendable ratio of saturated fatty acid:monounsaturated fatty acid:polyunsaturated fatty acid or a ratio of ω 6-unsaturated fatty acid:ω 3-unsaturated fatty acid. Research is still in progress ("Nutrition and Diseases of Oils and Fats", published by Saiwai Shobo, "The 6$^{th}$ edition of Recommended Dietary Allowances for Japanese", Ministry of Health and Welfare). It is pointed out that trans unsaturated fatty acids increase the LDL-cholesterol level, thereby exerting a bad influence on health, for example, increasing the risk of cardiovascular diseases. In November 1999, FDA proposed to include the amount of trans unsaturated fatty acids in nutritional labeling and to limit the amount of trans unsaturated fatty acids in foods having health claims or products having nutrient content claims (FDA home page).

With a view to preventing obesity, substitutes for fats and oils or non-absorptive fats and oils have been developed and typical ones include sucrose fatty acid polyester (U.S. Pat. No. 3,600,186). It is excreted without being absorbed in the body so that the calories derived from fat is 0 kcal/g. There is however a potential problem that it can cause anal leakage and inhibit absorption of fat-soluble vitamins. In addition, it does not become a supply source of essential fatty acids. The use of this substance was authorized by FDA in 1996, under the restriction that a semi-solid or solid sucrose fatty acid polyester having a melting point of 37.8 to 71.1° C. and containing predetermined amounts of vitamins A, D, E and K can be used only for salty snack foods. This restriction is made for preventing both anal leakage and inhibition of absorption of fat-soluble vitamins. It is known that a medium-chain fatty acid triglyceride (MCT) is not accumulated on the body, but it has poor heat stability. Similar effects of conjugated linoleic acid, fish oil or perilla oil are disclosed (Lipids, 32, 853(1997), J. Agric. Food Chem., 46, 1225(1998)).

Further, disclosed with attention paid to the glyceride structure are an edible oil composition (EP Patent No. 0525,915), a cholesterol-level lowering agent (Japanese Patent No. 2035495), an agent for lowering the triglyceride concentration in serum (Japanese Patent Application Laid-Open No. 4-300825), a body weight increase inhibitor (Japanese Patent Application Laid-Open No. 4-300826), a preventive or therapeutic agent for fatty liver (Japanese Patent Application Laid-Open No. 4-300828) and a liquid general-purpose oil/fat composition (U.S. Pat. No. 6,004, 611). They paid attention only to the effect derived from the diglyceride structure, and did not induce effects of diglyceride at the maximum.

An object of the present invention is to provide an extremely useful oil/fat composition which can meet the recent demand and contributes to good health, more specifically, which is free from side effects such as anal leakage or inhibition of absorption of fat-soluble vitamins, is safe and can overcome the drawback of oils and fats such as a tendency to obesity, has incomparable body-fat burning•visceral-fat burning action and has excellent stability against autoxidation.

DISCLOSURE OF THE INVENTION

The present inventors have found that a diglyceride having a specific unsaturated fatty acid constitution has excellent visceral-fat burning property (visceral-fat reducing property) and body-fat burning property.

The present invention provides an oil/fat composition comprising 60 to 100 wt. % of a diglyceride wherein the diglyceride has, as its fatty acid constituent, 15 to 90 wt. % of an ω 3-unsaturated fatty acid having less than 20 carbon atoms and has a cis ω 3-unsaturated fatty acid/(cis ω 6-unsaturated fatty acid+saturated fatty acid+trans unsaturated fatty acid) at a weight ratio of 1 to 6.

DETAILED DESCRIPTION OF THE PREFERRED EMBODIMENTS

The diglyceride to be used in the present invention is required to have, as 15 to 90 wt. % (which will hereafter be described "%" simply) of its fatty acid constituents, an ω 3-unsaturated fatty acid having less than 20 carbon atoms.

The term "ω 3-unsaturated fatty acid" as used herein means a fatty acid having a first unsaturated bond at the third carbon atom from the -position and having at least two carbon-carbon unsaturated bonds. Specific examples include α-linolenic acid (all cis-9,12,15-octadecatrienoic acid) and stearidonic acid (all cis-6,9,12,15-octadecatetraenoic acid), with α-linolenic acid being particularly preferred.

The ω 3-unsaturated fatty acid having less than 20 carbon atoms is preferred to be incorporated in a diglyceride in an amount of 20 to 80%, more preferably 30 to 70%, especially 40 to 65% for exhibition of various physiologically active effects.

From the viewpoint of exhibition of physiologically active effects, stability against autoxidation and balance of fatty acids, a weight ratio of cis ω 3-unsaturated fatty acid to (cis ω 6-unsaturated fatty acid+saturated fatty acid+trans unsaturated fatty acid) is required to be 1 to 6, preferably 1.2 to 5, more preferably 1.4 to 4, especially 1.5 to 3.

The trans unsaturated fatty acid is an unsaturated fatty acid having, in the molecule thereof, at least one trans double bond. It can be measured by infrared absorption spectrum (Standard Methods for the Analysis of Oils, Fats and Derivatives 2.4.4.2 of Japan Oil Chemists' Society) or gas chromatography (JAOCS, 70, 425(1993), etc.). The content of the trans unsaturated fatty acid is preferably 5% or less for health reasons.

The diglyceride preferably contains, as another fatty acid constituent, 2 to 50%, preferably 5 to 40%, especially 10 to 30% of a $C_{18-22}$ ω 6-unsaturated fatty acid such as linoleic acid and γ-linolenic acid from the viewpoints of intake balance of fatty acids and physiologically active effects of an ω 3-unsaturated fatty acid. For physiologically active effects, the content of unsaturated fatty acids is preferably 70 to 100%, more preferably 80 to 100%, especially 90 to 100% of the fatty acid constituents of the diglyceride.

The content of an ω 9-unsaturated fatty acid is preferably 10 to 60% of the fatty acid constituents of the diglyceride, and in consideration of the intake balance of fatty acids, physiological activity and stability against oxidation, 10 to 50% is more preferred and 12 to 30% is especially preferred. Examples of the ω 9-unsaturated fatty acid include $C_{10-24}$ ω 9-unsaturated fatty acids, preferably $C_{16-22}$ ω 9-unsaturated fatty acids, more specifically, oleic acid, eicosamonoenoic acid and docosamonoenoic acid. Of these, oleic acid is particularly preferred. For example, olein-olein diglyceride is preferably contained in an amount less than 45%, more preferably 40% or less from the viewpoint of physiological activity.

The diglyceride containing such fatty acid constituents is incorporated in the oil/fat composition in an amount of 60 to 100%, but from the viewpoint of physiologically active effects and industrial productivity, their content is preferably 65 to 99%, more preferably 70 to 95%, especially 75 to 92%. The remaining components in the oil/fat composition are monoglyceride, triglyceride and free fatty acid. The monoglyceride is incorporated in an amount of 0 to 40%, preferably 0.1 to 10%, more preferably 0.1 to 4%, especially 0.1 to 2% in the oil/fat composition in order to bring about taste masking effects, prevent smoking upon heating and heighten industrial productivity. An amount of 0.1 to 1.5% is most preferred. Fatty acid constituents of the monoglyceride are preferred to be similar to those of the diglyceride. The free fatty acid (salt) has a strange taste so that in order to prevent a deterioration in taste, its content is preferably suppressed to 3.5% or less, preferably 2.5% or less, more preferably 1.5% or less, especially 1% or less, most preferably 0.5% or less. The oil/fat composition contains a triglyceride as the balance. Its content is preferably 0 to 40%, preferably 0.1 to 34.9%, more preferably 2 to 29.9%, especially 6 to 24.9%. The triglyceride preferably contains, as its fatty acid constituents, 55 to 100%, more preferably 70 to 100%, still more preferably 80 to 100%, especially 90 to 100% of $C_{8-24}$, particularly $C_{16-22}$ unsaturated fatty acids from the viewpoint of physiologically active effects.

In the oil/fat composition of the present invention, polyunsaturated fatty acids, such as eicosapentaenoic acid, docosahexaenoic acid and arachidonic acid, having at least four carbon-carbon double bonds are preferred to be incorporated in an amount not greater than 15%, preferably not greater than 5%, especially not greater than 2% of all the fatty acid constituents, for attaining stability against oxidation. The composition substantially free of such a polyunsaturated fatty acid is most preferred.

The oil/fat composition of the present invention may be prepared by subjecting an oil or fat having target fatty acid constituents and glycerin to ester exchange reaction or by acting lipase on a mixture of the target fatty acid constituents or ester thereof with glycerin, thereby conducting esterification. To prevent isomerization during reaction, esterification using lipase is more preferred. Since even in the esterification using lipase, isomerization can happen to occur owing to purifying means after completion of the reaction, it is preferred to purify under mild conditions so as not to cause isomerization of fatty acids. Moreover, use of a raw material oil or fat having a less trans acid content is preferred.

The oil/fat composition of the present invention is preferably provided for use after purified through degumming, acid-removing, decoloring, washing with water or deodorizing from the viewpoints of stability against oxidation and taste. It preferably has a peroxide value (POV, Standard Method for the Analysis of Oils, Fats and Derivatives 2.5.2.1 of Japan Oil Chemists' Society) of 10 or less, preferably 7 or less, more preferably 5 or less, especially 3 or less, most preferably 1 or less. The color (10R+Y) as measured by the Lovibond method (Standard Method for the Analysis of Oils, Fats and Derivatives 2.2.1.1 of Japan Oil Chemists' Society, 5¼ inch glass cell is used) is preferably 35 or less, more preferably 30 or less, still more preferably 25 or less, especially 20 or less.

A preferred oil/fat composition of the present invention comprises 65 to 99% of the diglyceride, 0.1 to 4% of the monoglyceride, 0.1 to 34.9% of the triglyceride and 1.5% or less of a free fatty acid (salt), wherein the diglyceride has, as its fatty acid constituents, 20 to 80% of α-linolenic acid, 10 to 60% of oleic acid, 2 to 50% of an ω 6-unsaturated fatty acid, 70 to 100% of an unsaturated fatty acid and a cis ω 3-unsaturated fatty acid/(cis ω 6-unsaturated fatty acid+saturated fatty acid+trans unsaturated fatty acid) at a weight ratio of 1.2 to 5; the triglyceride has, as its fatty acid constituent, 70 to 100% of an unsaturated fatty acid; and the content of a polyunsaturated fatty acid having at least 4 carbon-carbon double bonds is 5% or less based on all the fatty acid constituents of the oil/fat composition.

A more preferred oil/fat composition of the present invention comprises 70 to 95% of the diglyceride, 0.1 to 2% of the monoglyceride, 2 to 29.9% of the triglyceride and 1% or less of a free fatty acid (salt), wherein the diglyceride has, as its fatty acid constituents, 30 to 70% of α-linolenic acid, 10 to 50% of oleic acid, 5 to 40% of an ω 6-unsaturated fatty acid, 80 to 100% of an unsaturated fatty acid and a cis ω 3-unsaturated fatty acid/(cis ω 6-unsaturated fatty acid+saturated fatty acid+trans unsaturated fatty acid) at a weight ratio of 1.4 to 4; the triglyceride has, as its fatty acid constituent, 80 to 100% of an unsaturated fatty acid; and the content of a polyunsaturated fatty acid having at least 4 carbon-carbon double bonds is 2% or less based on all the fatty acid constituents of the oil/fat composition.

An especially preferred oil/fat composition of the present invention comprises 75 to 92% of the diglyceride, 0.1 to 1.5% of the monoglyceride, 6 to 24.9% of the triglyceride and 0.5 % or less of a free fatty acid (salt), wherein the diglyceride has, as its fatty acid constituents, 40 to 65% of α-linolenic acid, 12 to 30% of oleic acid, 10 to 30% of an ω 6-unsaturated fatty acid, 90 to 100% of an unsaturated fatty acid and a cis ω 3-unsaturated fatty acid/(cis ω 6-unsaturated fatty acid+saturated fatty acid+trans unsaturated fatty acid) at a weight ratio of 1.5 to 3; the triglyceride has, as its fatty acid constituent, 90 to 100% of an unsaturated fatty acid; and the content of a polyunsaturated fatty acid having at least 4 carbon-carbon double bonds is 0 in all the fatty acid constituents of the oil/fat composition.

The oil/fat composition of the present invention may contain an antioxidant. Any antioxidant is usable insofar as it is ordinarily employed for foods or pharmaceuticals. Combination of one or more of catechin, tocopherol, vitamin C fatty acid esters, phospholipid and natural antioxidant components is preferred, with catechin being particularly preferred. Examples of the vitamin C fatty acid esters include palmitate esters and stearate esters, while those of the natural antioxidant components include herbs such as rosemary and extracts from the leaves or roots of a peach. The antioxidant is preferably added to the oil/fat composition of the present invention in an amount of 0.01 to 5%, especially 0.05 to 1%.

The oil/fat composition of the present invention preferably contains a phytosterol in an amount of 0.05% or greater, especially 0.3% or greater because it has a cholesterol lowering effect. The phytosterol content in the oil/fat composition depends on its raw material oil/fat or preparation process. For example, when a commercially available fatty acid obtained by distillation is used as a raw material, the phytosterol content in the oil/fat composition is lower than when obtained by other methods. In the case of distillative preparation, it is preferred to add the phytosterol to give a content of 0.05% or greater. Although no particular limitation is imposed on the upper limit of the phytosterol content, contents within a range of 0.05% to 1.2% are preferred. It may be added in an amount of 1.2% to 20% when a further cholesterol reduction is intended. Examples of the phytosterol include that in free form such as α-sitosterol, β-sitosterol, stigmasterol, campesterol, α-sitostanol, β-sitostanol, stigmastanol, campestanol and cycloartenol; and that in ester form such as their fatty acid esters, ferulate esters and cinnamate esters.

It is more preferred to add a crystallization inhibitor to the oil/fat composition of the present invention, if necessary, to provide low temperature stability from a loss of transparency.

Examples of the crystallization inhibitor used in the present invention include polyol fatty acid esters such as polyglycerin-condensed ricinoleate esters, polyglycerin fatty acid esters, sucrose fatty acid esters, sorbitan fatty acid esters, polyoxyethylene sorbitan fatty acid esters, and propylene glycol fatty acid esters.

As the polyol fatty acid esters, polyglycerin fatty acid esters, sucrose fatty acid esters and sorbitan fatty acid esters each having an HLB (calculation formula of Griffin) of 4 or less, especially 3 or less are preferred.

The crystallization inhibitor is preferably added to the oil/fat composition of the present invention in an amount of 0.02 to 0.5%, especially 0.05 to 0.2%.

The oil/fat composition thus obtained exhibits, as well as excellent physiological activities such as promotion of visceral-fat burning, promotion of b)ody-fat burning, heightening of resting metabolism and acceleration of lipid metabolism, physiological activities such as promotion of blood-fat burning, improvement of liver function, lowering of leptin, lowering of PAI-1, lowering of blood sugar level, improvement of insulin resistance and lowering of a blood pressure. Moreover, owing to its excellent stability against autoxidation, it can be stored for a long period and in addition, has an excellent taste. Since an ω 3-unsaturated acyl group exists not as a free fatty acid but as an acyl group constituting the diglyceride, the composition acts even at a low concentration, has an immediate effect, has a good taste and is safe. Such excellent properties make it possible to use the oil/fat composition of the present invention for foods, feeds and pharmaceuticals.

The oil/fat composition of the present invention can be used for an oil/fat-containing food containing the composition as a part of the food. Healthy foods which exhibit a special function, thereby promoting health can be given as one example of such oil/fat-containing foods. Specific examples include capsules, tablets, powders, granules, bakery foods such as bread, cake, cookie, pie and pizza crust, oil-in-water type oil/fat-containing foods such as soup, dressing, mayonnaise, coffee creamer, whipped cream and ice cream, water-in-oil type oil/fat-containing foods such as margarine, spread and butter cream, confections, for example, chocolate, caramel, candy, snacks such as potato chips, and dessert, beverages, sauces, barbecue sauces, peanut butter, baking shortening, dough, filling, eerober, meat processed foods such as ham, sausage and hamburger steak, noodles, frozen foods, retort foods, cheese and roux. The above-exemplified oil/fat-containing food can be prepared by adding, in addition to the above-described oil/fat composition, food raw materials ordinarily employed depending on the kind of the food. The amount of the oil/fat composition of the present invention to be added to the food varies depending on the kind of the food, but is usually 0.1 to 100%, preferably 1 to 80%, especially 2 to 80%. It is preferably added in an amount of 0.1 to 50 g, preferably 0.5 to 10 g, especially 1 to 7.5 g, interins of the oil/fat composition, once or several times a day.

When a food contains an oil/fat derived from its raw material, a ratio of the oil/fat derived from the raw material to the oil/fat composition of the present invention is preferably 95:5 to 1:99, more preferably 95:5 to 5:95, still more preferably 85:15 to 5:95, especially 40:60 to 5:95.

When the oil/fat composition of the present invention is mixed with another food raw material and provided as an oil/fat-containing processed food, following raw materials can be used. Examples include edible oils or fats, for example, natural animal or vegetable oils or fats, and processed oils or fats obtained by subjecting these natural animal or vegetable oils or fats to ester exchange reaction, hydrogenation or fractionation. Preferred examples include soybean oil, rapeseed oil, rice bran oil, corn oil, palm oil, linseed oil, perilla oil and fish oil, and processed oils or fats thereof. Examples of an emulsifier include various proteins such as egg protein, soybean protein and milk protein, proteins separated therefrom or (partially) decomposed products of these proteins; and sucrose fatty acid esters, sorbitan fatty acid esters, polyoxyethylene sorbitan fatty acid esters, glycerin fatty acid monoesters, polyglycerin fatty acid esters, polyglycerin condensed ricinoleate esters, glycerin organic acid fatty acid esters, propylene glycol fatty acid esters and lecithin, and enzymatically decomposed products thereof. Examples of a stabilizer include polysaccharide thickeners and starches such as xanthane gum, gellan gum, guar gum, carrageenan, pectin, tragacanth gum and konjac mannan. In addition, a flavor developing agent such as salt, sugar, vinegar or seasoning, flavoring such as spice and flavor, colorant and antioxidant such as tocopherol or natural antioxidant component can be added.

As oil/fat-containing foods of the present invention, following ones are preferred.

(1) Oil-in-water Type Oil/Fat-containing Foods

A weight ratio of oil phase to water phase is 1/99 to 90/10, preferably 10/90 to 80/20, especially 30/70 to 75/25 in terms of oil phase/water phase. The diglyceride content in the oil phase is 60 to 100%, preferably 65 to 99%, especially 75 to 92%. The α-linolenic acid content in the fatty acid constituents of a diglyceride is 20 to 80%, preferably 30 to 70%, especially 40 to 65%. The ratio of cis ω 3-unsaturated fatty acid/(cis ω 6-unsaturated fatty acid+saturated fatty acid+trans unsaturated fatty acid) is 1 to 6, preferably 1.2 to 5, especially 1.5 to 3. The phytosterol content is 0 to 10%, preferably 1 to 7%, especially 2 to 5%, the emulsifier content is 0.01 to 5%, especially 0.05 to 3%, and the stabilizer content is 0.5%, especially 0.01 o 2%. The pH is 1.0 to 7.0, preferably 2.0 to 6.0, especially 3.0 to 5.0 and it can be adjusted by an organic acid (or salt thereof) such as vinegar, lemon juice or citric acid, or an inorganic acid (or salt thereof) such as phosphoric acid (salt thereof).

From the above-described materials, oil-in-water type oil/fat containing foods such as dressing, mayonnaise, coffee creamer, ice cream, sauce, soup and beverage can be prepared.

(2) Water-in-oil Type Oil/Fat-containing Foods

A weight ratio of water phase to oil phase is 90/10 to 1/99, preferably 80/20 to 10/90, especially 70/30 to 35/65. The diglyceride content in the oil phase is 60 to 100%, preferably 65 to 99%, especially 75 to 92%. The α-linolenic acid content in the fatty acid constituents of a diglyceride is 20 to 80%, preferably 30 to 70%, especially 40 to 65%. The ratio of cis ω 3-unsaturated fatty acid/(cis ω 6-unsaturated fatty acid+saturated fatty acid+trans unsaturated fatty acid) is 1 to 6, preferably 1.2 to 5, especially 1.5 to 3. The phytosterol content is 0 to 10%, preferably 1 to 7%, especially 2 to 5%, and the emulsifier content is 0.01 to 5%, especially 0.05 to 3%.

From the above-described materials, water-in-oil type oil/fat-containing foods such as margarine and spread can be prepared in a conventional manner.

(3) Pocket-size Oil/Fat-containing Foods

The oil/fat content is 1 to 30%, especially 1 to 20% and the diglyceride content in the oil/fat is 60 to 100%, preferably 65 to 99%, especially 40 to 65%. The α-linolenic acid content in the fatty acid constituents of a diglyceride is 20 to 80%, preferably 30 to 70%, especially 40 to 65%. The ratio of cis ω 3-unsaturated fatty acid/(cis ω 6-unsaturated fatty acid+saturated fatty acid+trans unsaturated fatty acid) is 1 to 6, preferably 1.2 to 5, especially 1.5 to 3. The phytosterol content is 0 to 20%, preferably 1 to 20%, especially 2 to 15%. Carbohydrate such as sucrose, glucose, fructose, maltose, xylitol, sorbitol, erythritol or starch is preferably added in an amount of 40 to 99%, while a carbonating agent composed of an effervescing agent such as sodium bicarbonate and an acidic agent such as tartaric acid, fulmaric acid or citric acid is preferably added in an amount of 0 to 20%, especially 1 to 10%.

Oil/fat-containing pocket-size foods such as tablet, candy, caramel and gummy candy can be prepared in a conventional manner by using the above-described materials. In particular, use of a carbonating agent makes the food melty in the mouth.

(4) Bakery Foods

The oil/fat content is 1 to 40%, especially 5 to 35% and the diglyceride content in the oil/fat is preferably 60 to 100%, more preferably 65 to 99%, especially 75 to 92%. The α-linolenic acid content in the fatty acid constituents of a diglyceride is 20 to 80%, more preferably 30 to 70%, especially 40 to 65%. The content ratio of cis ω 3-unsaturated fatty acid/(cis ω 6-unsaturated fatty acid+saturated fatty acid+trans unsaturated fatty acid) is 1 to 6, preferably 1.2 to 5, especially 1.5 to 3. The phytosterol content is 0 to 20%, preferably 1 to 20%, especially 1 to 15%. The flour content is 10 to 70%, with 20 to 60% being especially preferred. The bakery food is preferred to contain at least one of hen's whole egg, egg yolk and egg white, and separated or decomposed product thereof in an amount of 0 to 30%, especially 5 to 25%. The salt content is preferably 0 to 2%, especially 0.1 to 1%. The carbohydrate content is 0 to 25%, while the baking powder content is 0 to 1%.

From these materials, bakery foods such as bread, cake, biscuit and cookie can be prepared in a conventional manner.

Examples of the pharmaceuticals include orally administrable preparations, e.g., solid preparations such as powder, granule, capsule, pill and tablet, liquid preparations such as aqueous preparation, suspension and emulsion, and gel preparations. Such an orally administrable agent can be prepared by adding, in addition to the oil/fat composition, excipient, disintegrator, binder, lubricant, surfactant, alcohol, water, water-soluble polymer, sweetening agent, taste corrigent and acidifier, each ordinarily employed according to the dosage form of the orally administrable preparation. The amount of the oil/fat composition of the present invention to be added to the orally-administrable preparation can differ with its purpose or dosage form, but addition in an amount of 0.1 to 100%, preferably 1 to 80%, especially 5 to 80% is usually preferred. As a dose, 0.1 to 50 g, preferably 0.5 to 10 g, especially 1 to 7.5 g, in terms of the oil/fat composition, is preferably administered once or several portions a day.

Examples of the feed include livestock feed for cow, pig, fowl and sheep, feed for small animals such as rabbit, rat and mouse, feed for fishes such as eel, porgy, yellowtail and shrimp, and pet foods for dog, cat, bird and squirrel. Although the amount of the oil/fat composition of the present invention to be added to feed differs depending on the using purpose of the feed, 1 to 30% is usually added, with 1 to 20% being especially preferred.

Having generally described this invention, a further understanding can be obtained by reference to certain specific examples which are provided herein for purposes of illustration only and are not intended to be limiting unless otherwise specified.

EXAMPLES

Example 1

The following oil/fat compositions were prepared.

Oil/Fat Composition 1

To a mixture of 650 parts by weight of perilla oil fatty acid and 107 parts by weight of glycerin, the immobilized lipase preparation, "Lipozyme IM" (product of Novo Nordisk Bioindustry) was added and the resulting mixture was esterified at 40° C. for 5 hours at 0.07 hPa, followed by the removal of the lipase preparation using filtration. The resulting reaction mixture was then subjected to molecular distillation (215° C., 0.07 hPa), followed by decoloring, washing with water and then, deodorizing at 215° C. for 2 hours, whereby Oil/fat composition 1 was obtained.

Oil/Fat Composition 2

A mixture of 400 parts by weight of linseed oil, 200 parts by weight of rapeseed oil, 120 parts by weight of glycerin and 2 parts by weight of calcium hydroxide was reacted at 230° C. for 0.5 hour in a nitrogen gas atmosphere. The reaction mixture was then allowed to stand for 12 hours, followed by removal of the glycerin phase. After the oil phase (oil/fat composition) was washed with a 50% aqueous solution of citric acid in an amount of 2 times the weight of the oil phase, an oil/fat mixture was taken out by centrifugal separation. The mixture was subjected to molecular distillation (at 215° C., 0.07 hPa), followed by decoloring, washing with water and then, deodorizing at 215° C. for 2 hours, whereby Oil/fat composition 2 was obtained.

Oil/Fat Composition 3

A mixture of 650 parts by weight of rapeseed fatty acid and 107 parts by weight of glycerin was esterified in a similar manner to that employed for Oil/fat composition 1. The resulting reaction mixture was subjected to molecular distillation (at 235° C., 0.07 hPa), followed by washing with water and then, deodorizing at 235° C. for 1 hour, whereby Oil/fat composition 3 was obtained.

Oil/Fat Composition 4

A mixture of 375 parts by weight of linseed oil, 375 parts by weight of safflower oil, 250 parts by weight of glycerin and 2 parts by weight of calcium hydroxide was reacted and purified in a similar manner to that employed for Oil/fat composition 2, whereby Oil/fat composition 4 was obtained.

Oil/Fat Composition 5

A mixture of 1286 parts by weight of perilla oil and 514 parts by weight of water was hydrolyzed by heating at 230° C. for 10 hours in an autoclave. After cooling, the fatty acid (oil phase) decomposed by centrifugal separation was taken out. A mixture of 650 parts by weight of the fatty acid thus obtained by decomposition and 107 parts by weight of glycerin was reacted and purified in a similar manner to that employed for Oil/fat composition 1, whereby Oil/fat composition 5 was obtained.

Oil/Fat Composition 1a

Oil/fat composition 1a was prepared by mixing 100 parts by weight of Oil/fat composition 1, 0.04 part by weight of tocopherol (Mix Vitamin E "MDE-6000"; product of Yashiro Co., Ltd.), 0.2 part by weight of catechin ("Sunkatol No. 1"; product of Taiyo Kagaku Co., Ltd.), 0.25 part by weight of rosemary ("Herbalox type HT-0 Extract"; product of Kalsec, Inc.), 0.05 part by weight of phytosterol (product of Tama Biochemical Co., Ltd.) and 0.1 part by weight of "THL-3" (polyglycerin fatty acid ester, HLB=1; product of Sakamoto Yakuhin Kogyo Co., Ltd.).

Oil/Fat Composition 1b

Oil/fat composition 1b was prepared by mixing 100 parts by weight of Oil/fat composition 1, 0.04 part by weight of tocopherol and 0.1 part by weight of catechin.

Oil/Fat Composition 1c

Oil/fat composition 1c was prepared by mixing 100 parts by weight of Oil/fat composition 1, 0.04 part by weight of tocopherol, 0.1 part by weight of catechin, 0.02 part by weight of VCP (vitamin C palmitate; product of Roche, Ltd.) and 2.0 parts by weight of phytosterol.

TABLE 1

|  |  | Oil/fat composition | | | | |
|---|---|---|---|---|---|---|
|  |  | Invention product | | Comparative product | | |
|  |  | 1 | 2 | 3 | 4 | 5 |
| Glyceride composition *1 | TG | 13.4 | 15.6 | 13.5 | 16.4 | 38.8 |
|  | DG | 85.1 | 81.3 | 85.1 | 80.2 | 60.7 |
|  | MG | 1.4 | 3.1 | 1.1 | 3.4 | 0.3 |
|  | FFA | 0.1 | 0.0 | 0.3 | 0.0 | 0.2 |
| DG-constituting fatty acids *2 | C18:3 (ω 3) | 61.6 | 44.2 | 10.5 | 29.0 | 55.6 |
|  | cis | 58.9 | 38.6 | 10.2 | 24.7 | 36.9 |
|  | trans | 2.7 | 5.6 | 0.3 | 4.3 | 19.7 |
|  | C18:1 (ω 9) | 12.8 | 29.0 | 57.0 | 16.4 | 15.2 |
|  | C20:1 | 0.0 | 0.6 | 1.7 | 0.0 | 0.0 |
|  | C22:1 | 0.0 | 0.3 | 1.0 | 0.0 | 0.0 |
|  | C18:2 (ω 6) | 16.4 | 17.5 | 21.9 | 44.8 | 17.0 |
|  | cis | 16.4 | 17.1 | 21.9 | 43.5 | 14.8 |
|  | trans | 0.0 | 0.4 | 0.0 | 1.3 | 2.2 |
|  | C16:0 | 5.6 | 5.7 | 3.7 | 5.8 | 5.7 |
|  | C18:0 | 1.5 | 2.5 | 1.8 | 2.7 | 1.8 |
|  | cis- 3/(cis- ω 6 + saturated + trans) | 2.2 | 1.2 | 0.4 | 0.4 | 0.8 |
| Acid value (AV) |  | 0.16 | ≦0.1 | 0.62 | ≦0.1 | 0.43 |
| Peroxide value (POV) |  | 0.12 | 0.13 | 0.19 | 0.20 | 0.37 |
| Color (10R + Y) |  | 16.6 | 22.4 | 13.7 | 25.7 | 31.5 |

*1: measured by gas chromatography after trimethylsilylation
*2: measured by gas chromatography after methylation

Example 2

A diet obtained by replacing a portion corresponding to 4% of the starch of a high-fat and high-sucrose diet (control diet) having the below-described composition with an oil/fat composition or oil/fat was administered to C57BL/6J male mice (a model of dietary type II diabetes) aged seven weeks for continuous 4 weeks in a similar manner to a usual diet. They were then dissected. The total fat weight (visceral fat weight) of perinephric, epididymal, mesenteric and retroperitoneal fat weights and a weight gain were measured and their results are shown in Table 2.

| Diet composition | |
|---|---|
| Casein | 20.0% |
| Soybean oil | 20.0 |
| Lard | 10.0 |
| Mineral mixture | 3.5 |
| Vitamin mixture | 1.0 |
| Cellulose | 4.0 |

-continued

| Diet composition | |
|---|---|
| Sucrose | 13.0 |
| Starch | 28.5 |

TABLE 2

| Oil/fat composition or oil/fat | | Visceral fat weight[#] | Body weight gain[#] |
|---|---|---|---|
| Invention product | Oil/fat composition 1 | 70.7* | 63.5** |
| | Oil/fat composition 2 | 83.3* | 77.8* |
| Comparative product | Perilla oil | 109 | 115 |
| | Oil/fat composition 3 | 110 | 112 |

[#]Visceral fat weight and body weight gain of a rat fed with a control diet were each designated as 100.
Test to determine significant difference from control diet group (Student t-test)
*p < 0.05
**p < 0.01

The rats fed with a diet containing the oil/fat composition of the present invention were recognized to have a significant difference from the rats fed with a control diet and a marked reduction in the visceral fat weight and body weight were recognized.

Example 3

After Oil/fat composition 1 and soybean oil, each 2 g/day, encapsulated in a soft capsule were administered to two groups of 8 normal adult male volunteers, respectively for continuous 2 months, their body weight, waist circumference, visceral fat area (CT), subcutaneous fat area (CT), blood triglyceride level, and blood plasminogen activator inhibitor type-1 (PAI-1) level were measured.

TABLE 3

| | Soybean oil | Oil/fat composition 1 |
|---|---|---|
| Visceral CT | 103.3 | 88.3** |
| Subcutaneous CT | 97.1 | 94.2 |
| Blood TG | 104.4 | 96.3 |
| PAI-1 | 101.0 | 76.3** |
| Body weight | 100.9 | 98.6* |
| Waist | 99.8 | 98.8 |

: Each item before administration was designated as 100.
: Test on significant difference between groups
*P < 0.1
**P < 0.05

Lowering was recognized in any indexes as a result of administration of the soft capsule containing Oil/fat composition 1 of the present invention.

Example 4

Stability Against Autoxidation

Oil/fat composition or oil/fat (20 g) was charged in a 50 mL sample bottle. Without a lid, it was allowed to stand at 40° C. for 5 days and then, the peroxide value (POV) was measured (in accordance with Standard Method for the Analysis of Oils, Fats and Derivatives 2.5.2.1 of Japan Oil Chemists' Society). From the results shown in Table 4, it has been found that any oil/fat composition of the present invention exhibited good stability against autoxidation.

TABLE 4

| Oil/fat composition or oil/fat | | $\Delta$POV |
|---|---|---|
| Invention product | Oil/fat composition 1 | 1.08 |
| | Oil/fat composition 2 | 0.82 |
| Comparative product | Oil/fat composition 4 | 8.26 |
| | Oil/fat composition 5 | 10.83 |
| | Perilla oil | 1.64 |

$\Delta$POV = POV after 5 days − initial POV

Example 5

ALA-DG synthesized from purified perilla oil (product of Ohta Oil Mill Co., Ltd.) by using immobilized lipase in accordance with the method of Birgitte, et al. (JAOCS, 65, 905(1988)) was encapsulated into capsules, each 400 mg/capsule. Analyzed results of compositions of glyceride and fatty acid constituents are shown in Table 5.

The intake amount of ALA-DG was set at 5 capsules/day (2 g/day).

Tests were made on thirteen normal male volunteers who were aged from 34 to 51, were a little fat (BMI>22.0) and had a rather high serum triglyceride level. In order to study fluctuations in lipid metabolism induced by 6-week intake of ALA-DG, the fasting blood was collected from them before and after the intake of ALA-DG. An oxygen intake amount, upon fasting, of the seven subjects who consented to this test, among the thirteen blood-collected subjects, was measured. On the day before the test, they took the same supper having a calorie of 1300 Kcal and containing 30 g of a lipid. The oxygen intake amount was measured after fasting for 12 hours.

Upon initiation of the test, the age of 13 subjects was 40.1±1.7 and their BMI (body mass index) was 25.0±0.7. The age of 7 subjects who were measured for an oxygen intake amount was 43.4±2.4 and their BMI was 24.1±0.5.

During these tests, subjects were instructed to have a similar meal and similar life to that before the initiation of the test except for the intake of a test substance. In conformity with Declaration of Helsinki, the tests were made under the observation of a doctor after obtaining the approval of Clinical Test Ethics Committee of Kao Corporation, giving sufficient explanation to the subjects and obtaining a written consent from them.

TABLE 5

| Compositions of ALA-DG | |
|---|---|
| Glycerides (%) | |
| TG | 13.4 |
| DG | 85.1 |
| Others | 1.5 |
| Fatty acids (%) | |
| C16:0 | 5.6 |
| C18:0 | 1.5 |
| C18:1 | 12.8 |
| C18:2 | 16.4 |
| C18:3 | 59.3 |

Method for Physical Examination

For physical examination, height, weight, waist circumference, hip circumference, subcutaneous fat tlhickness, and ratio of body fat were measured. As the waist circumference and hip circumference, the waist circumference just above the navel and hip circumference in its widest zone, each in the standing position, measured in accordance by the standards of Japan Obesity Association were adopted. Thickness of subcutaneous fat was measured at two sites, that is, the midpoint of the upper arm and the below point of the shoulder blade in the back by using a fat-o-meter (product of Takei Scientific Instruments Co., Ltd.) in accordance with the caliper method. The ratio of body fat was measured at the leg by "BODY FAT ANALYZER TBF-410" manufactured by Tanita Corporation and at the arm by a body fat analyzer "HBF-302" manufactured by OMRON Corporation.

The data were indicated by mean±standard error. The paired t-test was employed for determining a ratio between before and after intake of ALA-DG. In each case, $p<0.05$ meant existence of a significant difference.

Measurement of Oxygen Intake Amount and Calculation of Resting Metabolic Amount Therefrom The subjects were laid quietly for 10 minutes and then measured for their oxygen intake amount for 3 minutes upon resting using "METAVINE-N" manufactured by VINE Corporation. From the value thus obtained, a resting metabolic rate was calculated.

Blood Collection and Analysis of Serum and Plasma Samples

The blood was collected from the vein at the bent side portion of the upper arm and the serum and plasma of it were provided for various biochemical tests. Among the various testing items, analyzed were serum triglyceride (TG), phospholipid (PL), free fatty acid (NEFA), total cholesterol (T-cho), LDL-cho, HDL-cho, remnant lipoprotein cholesterol (RLP-cho), remnant lipoprotein triglyceride (RLP-TG), acetoacetic acid, 3-hydroxybutyric acid, total keton body and liver function values (GOT, GPT, γ-GTP). TG, cholesterol (cho) and PL in the VLDL fractions were also measured.

Influence of ALA-DG Intake on Fasting Serum Components

Measured results of the fasting serum components before and after the intake of ALA-DG are shown in Table 6.

TABLE 6

Changes in Serum Metabolic Indexes by ALA-DG Treatment

|  | Before treatment | After treatment |
|---|---|---|
| Serum TG (mg/dL) | 175.0 ± 21.3 | 145.4 ± 11.0 |
| PL (mg/Dl) | 236.4 ± 9.6 | 223.8 ± 8.3* |
| NEFA (mEq/L) | 0.6 ± 0.1 | 0.6 ± 0.1 |
| T-cho (mg/dL) | 211.3 ± 9.7 | 203.1 ± 8.0 |
| LDL-cho (mg/dL) | 131.7 ± 8.7 | 124.2 ± 6.9 |
| HDL-cho (mg/dL) | 51.8 ± 5.7 | 49.3 ± 5.1 |
| RLP-cho (mg/dL) | 7.4 ± 1.0 | 5.8 ± 0.6* |
| γ -GTP (IU/L) | 45.1 ± 10.5 | 41.6 ± 9.9 |
| GOT (IU/L) | 26.3 ± 4.8 | 22.2 ± 3.1 |
| GPT (IU/L) | 37.3 ± 9.9 | 30.6 ± 8.4** |
| Acetoacetic acid (μ mol/L) | 16.3 ± 2.0 | 22.9 ± 3.3* |
| 3-Hydroxybutyric acid (μ mol/L) | 30.3 ± 4.8 | 33.6 ± 4.9 |
| Total keton body (μ mol/L) | 44.8 ± 4.0 | 56.5 ± 7.7 |
| VLDL-TG (mg/dL) | 105.8 ± 14.1 | 86.8 ± 8.2* |
| VLDL-PL (mg/dL) | 35.0 ± 4.3 | 29.2 ± 2.1 |
| VLDL-cho (mg/Dl) | 27.2 ± 3.0 | 22.3 ± 1.4 |

Values are means ± SE
Significantly different from before treatment, *$p < 0.05$, **$p < 0.01$ The analytical results of the indexes related to lipid metabolism show that serum-triglyceride was low and particularly, VLDL-triglyceride showed a significant decrease.

No significant difference was observed in the other VLDL fraction, but VLDL-cho and VLDL-PL showed a decrease. RLP-cho and phospholipid each showed a significant decrease. The total keton body showed an increasing tendency but no significant difference appeared. Acetoacetic acid showed a significant increase. Among the liver finction values, GPT showed a significant decrease.

After 6-week ALA-DG intake, no significant change in each of weight, waist, hip, thickness of subcutaneous fat and body fat ratio was recognized.

Influence of ALA-DG Intake on Resting Metabolic Rate

A resting metabolic rate was calculated from the oxygen intake amount for 3 minutes. As a result, the resting metabolic rate after 6-week ALA-DG intake showed a significant increase by 2.9±0.8 Kcal/kg/day (117.3±4.6%) ($P<0.05$) compared with that before the test.

Example 6

Test was made using, as subjects, sixteen normal male volunteers from 25 to 40 years old belonging to the normal weight to obesity (class 1) judged from BMI based on the standards of the Japan Obesity Association (Obesity Research 6(1), 18–28(2000)). They were classified into a test group (eight subjects for ALA-DG group) and a control group (the other eight subjects for LA-TG group) so that these two groups had no significant difference in BMI before the starting of the test.

Upon this test, same ALA-DG with that employed in Example 5 was used. For LA-TG, soybean oil was employed. Compositions of them are shown below in Table 7.

TABLE 7

Compositions of experimental lipids

|  | LA-TG | ALA-DG |
|---|---|---|
| Glycerides (%) | | |
| TG | 97.8 | 13.4 |
| DG | 0.4 | 85.1 |
| Others | 1.8 | 1.5 |
| Fatty acids (%) | | |
| C16:0 | 10.4 | 5.6 |
| C18:0 | 4.4 | 1.5 |
| C18:1 | 24.5 | 12.8 |
| C18:2 | 51.2 | 16.4 |
| C18:3 | 7.4 | 59.3 |

Intake amount a day was set at 5 capsules ((400 mg × 5)/day).

Measurement:

Measurement was conducted for each of two groups. Physical examination and abdominal CT scanning were carried out before starting of the intake and 12 weeks after the starting of intake.

Method for Physical Examination

Physical examination was carried out by the same method as described in Example 5.

Abdominal CT Scanning

CT scanning was conducted at the cross-section at the naval part and at a position permitting the spleen and liver to be on the same cross-section. In accordance with the method of Tokunaga, et al., (Int. J. Obes., 7, 437(1983)), the total fat area, visceral fat area and subcutaneous fat area were determined from the CT image. In accordance with the method of Katoh, et al. (Acta hepatologica Japonica, 25, 1097(1984)), a liver/spleen CT ratio was determined. For CT scanning, "X Vision RIAL" of Toshiba Corporation was employed.

Analysis of Meal

Based on the meal diaiy written by each of the subjects, intake amounts of the calorie, protein, lipid and sugar and sufficiency of them relative to the recommended requirements in accordance with the 5th edition of Recomniended Dietary Allowances for Japanese were analyzed.

The data were indicated by mean±standard error. The paired t-test was employed for comparison between the initial value and Week 12 after starting of intake, while t-test was employed for determining the difference in a changing ratio between groups. In each case, $p<0.05$ meant the existence of a significant difference.

During these tests, subjects were instructed to have a similar meal and similar life to that before the starting of the test except for the intake of a test substance. In conformity with Declaration of Helsinki, the tests were made under the observation of a doctor after obtaining the approval of Clinical Test Ethics Committee of this company, giving sufficient explanation to the subjects and obtaining a written consent of the subjects.

The body composition data measured before the test are shown in Table 8.

TABLE 8

Initial Characteristics of Subjects

|  | LA-TG | ALA-DG |
|---|---|---|
| Weight (Kg) | 80.9 ± 3.8 | 78.1 ± 4.4 |
| Height (cm) | 170.5 ± 1.7 | 172.3 ± 1.3 |
| BMI (Kg/m$^2$) | 27.8 ± 1.1 | 26.2 ± 1.3 |
| Waist (cm) | 94.0 ± 2.8 | 91.8 ± 3.1 |
| Waist/Hip ratio | 0.904 ± 0.018 | 0.902 ± 0.014 |
| Total fat (cm$^2$) | 363.4 ± 41.4 | 350.9 ± 47.6 |
| Visceral fat (cm$^2$) | 145.6 ± 20.4 | 152.7 ± 20.5 |
| Subcutaneous fat (cm$^2$) | 217.8 ± 24.5 | 198.2 ± 28.8 |
| Liver/Spleen CT ratio | 0.85 ± 0.12 | 0.93 ± 0.11 |

Values are means ± SE

Details of the meals for 3 days were studied twice, that is, before starting of the test and during the test and intake amounts and sufficiency, relative to the recommended dietary allowances, of calorie, protein, lipid and sugar were calculated. An average intake amount a day during the test is shown in Table 9. It has been confirmed that there is no significant difference between groups in the intake amount and sufficiency, which is not shown in the table.

TABLE 9

Comparison of Nutrients Intake from foods between LA-TG and ALA-DG groups

|  | LA-TG | ALA-DG |
|---|---|---|
| Calorie (Kcal/day) | 2004 ± 111 | 1937 ± 83 |
| Protein (g/day) | 69 ± 4.2 | 74 ± 4.6 |
| Fat (g/day) | 71 ± 7.7 | 67 ± 5.2 |
| Sugar (g/day) | 253 ± 13.5 | 239 ± 10.7 |

Values are each mean ± SE

A change in each of the weight, BMI, waist circumference and waist/hip ratio measured after 12 weeks is shown as a relative value to the initial value of each subject set at 100 (Table 10).

TABLE 10

Changes in Rate of Variation in Body Indexes

|  | LA-TG 12 w | ALA-DG 12 w |
|---|---|---|
| Weight[1] | 100.66 ± 0.5 | 100.92 ± 0.6 |
| BMI[1] | 100.66 ± 0.5 | 100.92 ± 0.6 |
| Waist[1] | 100.10 ± 0.7 | 99.02 ± 0.5 |
| Waist Hip ratio[1] | 100.54 ± 0.7 | 99.20 ± 0.6 |
| Total fat[1] | 98.32 ± 2.5 | 92.36 ± 2.4## |
| Visceral fat[1] | 101.40 ± 4.6 | 88.68 ± 4.3#* |
| Subcutaneous fat[1] | 98.18 ± 3.5 | 94.80 ± 3.4 |
| Liver/Spleen CT ratio[1] | 104.32 ± 5.2 | 108.09 ± 5.0 |

Values are means ± SE
[1]Rate of variation means the percentage as the value at 0 week
Significantly different from the value at 0 week, #p < 0.05, ##p < 0.01

Significantly different from LA-TG subjects at 12 weeks, *p<0.05

Compared with the LA-TG group, the ALA-DG group showed an apparent decrease in the waist and waist/hiip ratio 12 weeks after starting of intake.

With regards to a change in each of the total fat area, visceral fat area, subcutaneous fat area and CT ratio 12 weeks after starting of intake, no significant difference was recognized in the LA-TG group. In the ALA-DG group, on the other hand, a significant reduction in each of the total fat area and visceral fat area compared with the initial value was recognized. Compared with the LA-TG group, the ALA-DG group showed an increase in liver/spleen CT ratio, indicating a reduction in the liver fat. Particularly in a change of the visceral fat, a significant reduction was recognized in the ALA-DG group compared with the LA-TG group.

Example 7

Reductions in body weight, visceral fat weight and liver weight were measured using rats in accordance with the following method.

Animal and Breeding Method

This test was made under the approval and the administration of Animal Care Committee and Animal Etlics Committee of Kao Corporation. As an experimental animal, C57BL/6J mice (7 week old, male, purchased from CLEA JAPAN/Tokyo) was bred at room temperature of 23±2° C. and relative humidity of 55±10% and under illumination from 7:00 to 19:00. After they were carried in, seven days were spent for habituation. They were weighed and classified into test groups so that average weights of these groups would be substantially equal (n=5/group). They were maintained on food and water ad libitum. Feeding was carried out using a Roden CAFE (product of Oriental Yeast Co., Ltd./ Tokyo) and the feed was changed every 2 days. The feed intake amount of each test group (n=5/cage/group) per 24 hours was measured once a week and energy intake amount was determined. Under the above-described conditions, they were bred for 4 weeks.

Test Substance and Raw Materials for Feed

ALA-DG was prepared from perilla oil in the presence of immobilized lipase in accordance with the method of Birgitte, et al. (JAOCS, 65, 905(1988)). Compositions of ALA-DG and a mixed oil (SR-oil) of safflower oil and rapeseed oil are shown in Table 11.

TABLE 11

Composition of Test Oils (%)

| Fatty Acid | SR-oil[a] | ALA-DG[b] |
|---|---|---|
| 16:0 | 6.0 | 5.7 |
| 18:0 | 2.2 | 1.8 |
| 18:1 | 29.1 | 14.0 |
| 18:2 | 57.8 | 15.9 |
| 18:3 | 2.5 | 60.8 |
| 20:0 | 0.4 | n.d. |
| 20:1 | 0.6 | n.d. |
| 22:0 | 0.3 | n.d. |
| 22:1 | 0.2 | n.d. |
| Others | 0.9 | 1.8 |
| Glycerides | | |
| MG | n.d. | 0.7 |
| DG | 1.1 | 85.2 |
| TG | 97.2 | 14.1 |

[a]safflower oil:rapeseed oil = 70:30
[b]α-linolenic acid rich diglyceride
n.d.; not detected In SR-oil, oleic acid and linoleic acid account for 29.1% and 57.8%, respectively, of the fatty acid constituents, while in ALA-DG, -linolenic acid accounts for 60.8% of the fatty acid constituents. The DG and TG contents in the acylglycerol of ALA-DG are 85.2% and 14.1%, respectively. A ratio of 1,3-diglyceride to 1,2-diglyceride was about 7:3. The lard, sucrose, casein, cellulose, mineral mixture, vitamin mixture and -potato starch were purchased from Oriental Yeast Co., Ltd., while the safflower oil and rapeseed oil were purchased from The Nisshin Oil Mills Ltd.

Composition and energy amount of the feed are shown in Table 12.

TABLE 12

Composition of Feeds in Experiment (%)

| | | | HF + ALA-DG | | |
|---|---|---|---|---|---|
| Ingredients | LF[a] | HF[b] | 1% ALA-DG | 2% ALA-DG | 4% ALA-DG |
| ALA-DG[c] | — | — | 1.0 | 2.0 | 4.0 |
| SR-oil[d] | 5.0 | 20.0 | 20.0 | 20.0 | 20.0 |
| Lard | — | 10.0 | 10.0 | 10.0 | 10.0 |
| Sucrose | — | 13.0 | 13.0 | 13.0 | 13.0 |
| Casein | 20.0 | 20.0 | 20.0 | 20.0 | 20.0 |
| Cellulose | 4.0 | 4.0 | 4.0 | 4.0 | 4.0 |
| Mineral mixture[e] | 3.5 | 3.5 | 3.5 | 3.5 | 3.5 |
| Vitamin mixture[f] | 1.0 | 1.0 | 1.0 | 1.0 | 1.0 |
| α-potato starch | 66.5 | 28.5 | 27.5 | 26.5 | 24.5 |
| Calorie (Kcal/100 g) | 399.7 | 522.2 | 527.1 | 532.0 | 541.8 |

[a]Low-fat diet
[b]High-fat diet
[c]α-linolenic acid rich diglyceride
[d]safflower oil:rapeseed oil = 70:30
[e]AIN-76 prescription
[f]AIN-76 prescription + choline bitartrate (20 g/100 g)

Low-fat feed (LF) contains therein 5% of a lipid, while high-fat feed (HF) contains 30% of a lipid and 13% of sucrose. Per 100 g of the feed, the calorie of LF is 399.7 Kcal and that of HF is 522.2 Kcal, indicating that the latter has an about 30% higher calorie than the former. The ALA-DG added feed was prepared by adding 1%, 2% or 4% of ALA-DG to HF. The amount was balanced with -potato starch. The feed thus prepared was divided into light-shading packages, each containing the feed for 2 days, and after nitrogen purging, these packages were stored at 4 C.

Measurement:

During the test, mice were weighed every week. Under fasting for 12 hours after completion of the test, they were anesthetized with ether. They were sacrificed under exsanguination and then anatomized. The visceral fat of each part (epididymal, mesenteric, retroperitoneal and perinephric) and the liver were weighed.

Body Weight (Table 13)

No significant difference in the initial body weight was recognized among test groups. In each test group, a weight increase was observed in Week 4. In the ALA-DG added group, a weight increase was suppressed compared with the HF group. In Week 4, a significant difference from the HF group was recognized at any concentration group both in weight and weight gain. The final body weight was almost similar to that of the LF group (no significant difference from the LF group). In each of the body weight and body weight gain in Week 4, the ALA-DG-4% group showed the lowest value. In the energy intake amount during the test, no significant difference was recognized between any two groups.

TABLE 13

Effects of ALA-DG on Body weight at 4 weeks in Experiment

| | Dietary treatment | | | | |
|---|---|---|---|---|---|
| | | | HF + ALA-DG[c] | | |
| | LF[a] | HF[b] | ALA-DG 1% | ALA-DG 2% | ALA-DG 4% |
| Body weight (g) | | | | | |
| Initial | 21.6 ± 1.3 | 21.6 ± 1.3 | 21.6 ± 0.9 | 21.6 ± 1.2 | 21.6 ± 1.2 |
| Final | 26.3 ± 1.2* | 29.0 ± 1.9 | 26.4 ± 0.3* | 26.6 ± 1.3* | 25.9 ± 2.0* |

TABLE 13-continued

Effects of ALA-DG on Body weight at 4 weeks in Experiment

| | | | Dietary treatment | | |
| --- | --- | --- | --- | --- | --- |
| | | | | HF + ALA-DG[c] | |
| | LF[a] | HF[b] | ALA-DG 1% | ALA-DG 2% | ALA-DG 4% |
| Gain (4 weeks) | 4.8 ± 0.4*** | 7.4 ± 1.5 | 4.9 ± 0.7*** | 5.0 ± 0.7*** | 4.3 ± 0.8*** |
| Liver weight (g) | 0.92 ± 0.05 | 0.99 ± 0.07 | 0.89 ± 0.04* | 0.92 ± 0.04 | 0.89 ± 0.07* |
| Visceral-fat weight (g) | | | | | |
| Total | 0.95 ± 0.10** | 1.46 ± 0.37 | 1.11 ± 0.18* | 1.00 ± 0.15** | 0.94 ± 0.16** |
| Epididymal | 0.49 ± 0.06** | 0.76 ± 0.21 | 0.56 ± 0.12* | 0.51 ± 0.08** | 0.49 ± 0.10** |
| Mesenteric | 0.32 ± 0.04* | 0.41 ± 0.08 | 0.34 ± 0.03* | 0.33 ± 0.05* | 0.30 ± 0.03** |
| Retroperitoneal | 0.10 ± 0.03*** | 0.24 ± 0.07 | 0.16 ± 0.05* | 0.12 ± 0.02*** | 0.11 ± 0.03*** |
| Perinephric | 0.04 ± 0.00 | 0.05 ± 0.02 | 0.04 ± 0.01 | 0.04 ± 0.01 | 0.04 ± 0.01 |
| Calorie (Kcal/cage/day) | 55.8 ± 7.1 | 62.9 ± 4.2 | 59.4 ± 5.5 | 57.2 ± 4.7 | 57.9 ± 5.1 |

Values are means ± SD (n = 5)
[a]Low-fat diet
[b]High-fat diet
[c]α-linolenic acid rich diglyceride
Significantly different from HF, *p < 0.05, p < 0.01, *p < 0.001

Visceral Fat Weight and Liver Weight (Table 13)

In the ALA-DG-added groups, the total visceral-fat weight (1%-added group p<0.05, 2%-, 4%-added groups p<0.01), epididymal fat weight (1%-added group p<0.05, 2%- and 4%-added groups p<0.01), mesenteric fat weight (1%- and 2%- added groups p<0.05, 4%-added groups p<0.01) and retroperitoneal fat weight (1%-added group p<0.05, 2%- and 4%-added groups p<0.001) each showed a significantly low value compared with those of the HF group. The visceral fat weight was recognized to show a concentration-dependent decreasing tendency with an increase in the amount of ALA-DG, and the ALA-DG-4% group showed the lowest value.

The liver weight of each of the ALA-DG-1% group and the ALA-DG-4% group showed a significantly low value (p<0.05) compared with that of the HF group, but no significant difference was recognized from the LF group.

Example 8

Oil-water Separated Dressing

To a mixture of wine vinegar, salt, pepper and mustard, Oil/fat composition 1a of the present invention was added, followed by stirring, whereby an oil-water separated dressing was prepared.

| | parts by weight |
| --- | --- |
| Oil/fat composition 1a of the invention | 45.0 |
| Wine vinegar | 25.0 |
| (product of Nakano Suten Co., Ltd.) | |
| Salt | 1.25 |
| Pepper | 0.3 |
| Mustard | 0.25 |

Example 9

Candies

To 200 g of refined sugar, 70 parts by weight of water was added and after dissolving the former in the latter by heating, boiling was continued to 148° C. Then heating was stopped. To 90 parts by weight of the resulting thick sugar syrup, 10 parts by weight of Oil/fat composition 1b was added. They were mixed, molded and then cut into candies.

Example 10

Tablets

Corn starch (44 parts by weight), 40 parts by weight of crystalline cellulose, 5 parts by weight of carboxymethylcellulose calcium, 0.5 part by weight of silicic anhydride, 0.5 part by weight of magnesium stearate and 10 parts by weight of Oil/fat composition 1c were mixed. The resulting mixture was compressed into tablets, each 200 mg in weight, by a tableting machine.

Example 11

Mayonnaise

| | |
| --- | --- |
| Oil/fat composition 1b of the invention | 65.0% |
| Egg yolk | 15.0 |
| Vinegar (acidity: 10%) | 7.0 |
| Refined sugar | 1.0 |
| Sodium glutamate | 0.4 |
| Salt | 0.3 |
| Mustard (powder) | 0.3 |
| Thickener (xanthane gum) | 0.2 |
| Water | 10.8 |

After stirring and mixing the above-described components other than Oil/fat composition 1b of the invention in a homomixer, Oil/fat composition 1b was added dropwise to the resulting mixture to preliminary emulsify the mixture. The preliminary emulsion was homogenized further by a homomixer, whereby a mayonnaise was prepared (pH 4.0).

Example 12

Margarine-like Spread

|  | parts by weight |
|---|---|
| (Oil phase) | |
| Oil/fat composition 1b of the invention | 33.4 |
| Hardened palm oil (IV = 2) | 4.0 |
| Hardened soybean oil (IV = 43) | 2.0 |
| Monoglyceride | 0.5 |
| Flavor | 0.1 |
| (Water phase) | |
| Distilled water | 58.4 |
| Skim milk | 0.3 |
| Salt | 1.3 |

The above-described oil phase and water phase were prepared, followed by mixing and emulsification in a homomixer. The resulting emulsion was cooled in a conventional manner and plasticized into a margarine-like spread.

Example 13

Tablets

|  | parts by weight |
|---|---|
| Xylitol | 28.4 |
| Sorbitol | 56.9 |
| Oil/fat composition 1b of the invention | 2.5 |
| Phytosterol (product of Tama Biochemical Co., Ltd.) | 2.5 |
| Flavor (ginger oil) | 1.2 |
| Citric acid | 3.0 |
| Sodium bicarbonate | 5.0 |
| Colorant (turmeric powder) | 0.5 |

After mixing the above-described raw materials, the resulting mixture was ground in a mortar. In a conventional manner, the resulting grind was compressed into tablets, each 2 g in weight, by a tableting machine (24.5 MPa, 4 seconds).

Example 14

Short Bread

|  | parts by weight |
|---|---|
| Weak flour | 350 |
| Strong flour | 150 |
| Refined sugar | 150 |
| Whole egg | 125 |
| Oil/fat composition 1b of the invention | 200 |
| Salt | 2.5 |

Refined sugar, salt and Oil/fat composition 1b of the invention were put into a bowl, followed by stirring by a Hobart mixer. The whole egg was gradually added to the resulting mixture and they were stirred again by the Hobart mixer. A mixture of weak flour and strong flour mixed in advance was added in three portions, followed by stirring by the Hobart mixer. The dough thus prepared was divided into pieces, each 25 g in weight, and filled in a metal mold. After baking in an oven (160° C., 50 minutes), they were released from the mold and allowed to cool down, whereby short breads were prepared.

Example 15

Brioche

|  | Parts by weight |
|---|---|
| Strong flour | 100 |
| Whole egg | 50 |
| Oil/fat composition 1b of the invention | 30 |
| Refined sugar | 15 |
| Water | 15 |
| Yeast | 5 |
| Yeast food | 0.1 |
| Skim milk | 4 |
| Salt | 2 |

The above-described raw materials other than Oil/fat composition 1b of the invention were mixed in a homomixer at a low speed for 30 seconds. Oil/fat composition 1b was then added, followed by mixing (for 5 minutes at a low speed and 22 minutes at a medium speed). For fermentation, the dough was allowed to rise at 27° C. for 30 minutes and then at low temperature of 5° C. for 15 minutes. The resulting dough was divided into pieces, each 37 g in weight, and they were rounded like a ball. After they were allowed to rise at 33° C. for 60 minutes for fermentation, they were baked in an oven (at 190° C. for 9 minutes), whereby brioches were obtained.

INDUSTRIAL APPLICABILITY

The oil/fat composition of the present invention has excellent visceral fat burning property, body fat burning property and stability against autoxidation.

Obviously, numerous modifications and variations of the present invention are possible in light of the above teachings. It is therefore to be understood that within the scope of the appended claims, the invention may be practiced otherwise than as specifically described herein This application is based on Japanese patent application 2000-239573 filed in the Japanese Patent Office on Aug. 8, 2000, the entire contents of which are hereby incorporated by reference.

The invention claimed is:

1. An oil/fat composition comprising 60 to 100 wt. % of a diglyceride, wherein said diglyceride has, as fatty acid constituents thereof, 15 to 90 wt. % of an ω 3-unsaturated fatty acid having less than 20 carbon atoms and a cis ω 3-unsaturated fatty acid/(cis ω 6-unsaturated fatty acid+ saturated fatty acid+trans unsaturated fatty acid) at a weight ratio of 1 to 6.

2. The oil/fat composition according to claim 1, wherein said ω 3-unsaturated fatty acid is α-linolenic acid.

3. The oil/fat composition according to claim 1, wherein said diglyceride has, as the fatty acid constituents thereof, 10 to 60 wt. % of an ω 9-unsaturated fatty acid.

4. The oil/fat composition according to claim 1, which comprises 65 to 99 wt. % of said diglyceride, 0.1 to 4 wt. % of a monoglyceride, 0.1 to 34.9 wt. % of a triglyceride and 1.5% or less of a free fatty acid (salt), wherein said diglyceride has, as fatty acid constituents thereof, 20 to 80 wt. % of α-linolenic acid, 10 to 60 wt. % of oleic acid, 2 to 50 wt. % of an ω 6-unsaturated fatty acid, 70 to 100 wt. % of an unsaturated fatty acid and a cis ω 3-unsaturated fatty acid/(cis ω 6-unsaturated fatty acid+saturated fatty acid+trans unsaturated fatty acid) at a weight ratio of 1.2 to 5; the triglyceride has, as a fatty acid constituent thereof, 70 to 100% of an unsaturated fatty acid; and the content of a polyunsaturated fatty acid having at least 4 carbon-carbon double bonds is 5 wt. % or less based on all the fatty acid constituents of the oil/fat composition.

5. The oil/fat composition according to claim 1, which comprises 70 to 95 wt. % of said diglyceride, 0.1 to 2 wt. % of a monoglyceride, 2 to 29.9 wt. % of a triglyceride and 1 wt. % or less of a free fatty acid (salt), wherein said diglyceride has, as fatty acid constituents thereof, 30 to 70 wt. % of α-linolenic acid, 10 to 50 wt. % of oleic acid, 5 to 40 wt. % of an ω 6-unsaturated fatty acid, 80 to 100 wt. % of an unsaturated fatty acid and a cis ω 3-unsaturated fatty acid/(cis ω 6-unsaturated fatty acid+saturated fatty acid+trans unsaturated fatty acid) at a weight ratio of 1.4 to 4; the triglyceride has, as a fatty acid constituent thereof, 80 to 100 wt. % of an unsaturated fatty acid; and the content of a polyunsaturated fatty acid having at least 4 carbon-carbon double bonds is 2% or less based on all the fatty acid constituents of the oil/fat composition.

6. The oil/fat composition according to claim 1, which comprises 75 to 92 wt. % of said diglyceride, 0.1 to 1.5 wt. % of a monoglyceride, 6 to 24.9 wt. % of a triglyceride and 0.5 wt. % or less of a free fatty acid (salt), wherein said diglyceride has, as fatty acid constituents thereof, 40 to 65 wt. % of α-linolenic acid, 12 to 30 wt. % of oleic acid, 10 to 30 wt. % of an ω 6-unsaturated fatty acid, 90 to 100 wt. % of an unsaturated fatty acid and a cis ω 3-unsaturated fatty acid/(cis ω 6-unsaturated fatty acid+saturated fatty acid+trans unsaturated fatty acid) at a weight ratio of 1.5 to 3; the triglyceride has, as a fatty acid constituent thereof, 90 to 100% of an unsaturated fatty acid; and the content of a polyunsaturated fatty acid having at least 4 carbon-carbon double bonds is 0 based on all the fatty acid constituents of the oil/fat composition.

7. The oil/fat composition according to claim 1, which further comprises a phytosterol in an amount of 0.05 wt. % or greater.

8. A food comprising the oil/fat composition as claimed in claim 1.

9. A feed comprising the oil/fat composition as claimed in claim 1.

10. A pharmiaceutical comprising the oil/fat composition of as claimed in claim 1.

11. The food according to claim 8, which is an oil-in-water type oil/fat-containing food.

12. The food according to claim 8, which is a water-in-oil type oil/fat-containing food.

13. The food according to claim 8, which is a pocket-size oil/fat-containing food.

14. The food according to claim 8, which is a bakery food.

15. In a method of preparing a food composition comprising a far or oil, the improvement comprising preparing said food composition with the oil/fat composition of claim 1.

* * * * *